US010371090B2

(12) United States Patent
Lovett et al.

(10) Patent No.: US 10,371,090 B2
(45) Date of Patent: Aug. 6, 2019

(54) VARIABLE AREA EXHAUST MIXER FOR A GAS TURBINE ENGINE

(71) Applicant: United Technologies Corporation, Hartford, CT (US)

(72) Inventors: Jeffery A. Lovett, Tolland, CT (US); Nathan L. Messersmith, South Windsor, CT (US); Sean P. Zamora, Coventry, CT (US)

(73) Assignee: United Technologies Corporation, Farmington, CT (US)

( * ) Notice: Subject to any disclaimer, the term of this patent is extended or adjusted under 35 U.S.C. 154(b) by 622 days.

(21) Appl. No.: 14/595,570

(22) Filed: Jan. 13, 2015

(65) Prior Publication Data

US 2015/0198116 A1 Jul. 16, 2015

Related U.S. Application Data

(60) Provisional application No. 61/926,671, filed on Jan. 13, 2014.

(51) Int. Cl.
| | |
|---|---|
| *F02K 3/075* | (2006.01) |
| *F02K 1/12* | (2006.01) |
| *F02K 3/077* | (2006.01) |
| *F02K 3/10* | (2006.01) |
| *F02K 3/105* | (2006.01) |

(52) U.S. Cl.
CPC ............ *F02K 1/1269* (2013.01); *F02K 3/075* (2013.01); *F02K 3/077* (2013.01); *F02K 3/10* (2013.01); *F02K 3/105* (2013.01); *F05D 2240/129* (2013.01); *Y02T 50/671* (2013.01)

(58) Field of Classification Search
CPC .......... F02K 3/077; F02K 1/386; F02K 3/075; F02K 1/46; F02K 1/383; F02K 1/825; F02K 1/30; F02K 1/1269; F02K 3/10; F02K 3/105; F05D 2250/312; F05D 2240/129; Y02T 50/671
See application file for complete search history.

(56) References Cited

U.S. PATENT DOCUMENTS

| | | | |
|---|---|---|---|
| 4,064,692 A | 12/1977 | Johnson et al. | |
| 4,069,661 A | 1/1978 | Rundell et al. | |
| 4,285,194 A | 8/1981 | Nash | |
| 4,817,378 A * | 4/1989 | Giffin, III | F23R 3/20 60/262 |
| 4,897,020 A * | 1/1990 | Tonks | F01D 5/186 415/115 |
| 5,154,052 A * | 10/1992 | Giffin, III | F02K 1/006 239/265.13 |
| 5,176,323 A * | 1/1993 | Nash | F02K 1/12 239/265.39 |
| 5,694,767 A | 12/1997 | Vdoviak et al. | |
| 5,806,303 A | 9/1998 | Johnson | |
| 5,809,772 A | 9/1998 | Giffin, III et al. | |
| 5,867,980 A | 2/1999 | Bartos | |

(Continued)

*Primary Examiner* — Jason H Duger
(74) *Attorney, Agent, or Firm* — O'Shea Getz P.C.

(57) ABSTRACT

A variable area exhaust mixer is provided for a gas turbine engine. The variable area exhaust mixer includes an outer wall with a multiple of doors. Each of the multiple of doors is operable to control a passage entrance into at least one of a multiple of circumferentially arrayed vanes with a respective strut flow passage which essentially alters its bypass ratio during flight to match requirements.

8 Claims, 7 Drawing Sheets

(56) References Cited

U.S. PATENT DOCUMENTS

| | | |
|---|---|---|
| 6,442,930 B1 | 9/2002 | Johnson et al. |
| 6,550,235 B2 | 4/2003 | Johnson et al. |
| 6,666,018 B2 | 12/2003 | Butler et al. |
| 6,901,739 B2 | 6/2005 | Christopherson |
| 7,134,271 B2 | 11/2006 | Baughman et al. |
| 7,188,467 B2 | 3/2007 | Johnson |
| 7,216,475 B2 | 5/2007 | Johnson |
| 7,246,484 B2 | 7/2007 | Giffin, III et al. |
| 7,395,657 B2 | 7/2008 | Johnson |
| 7,730,714 B2 | 6/2010 | Wood et al. |
| 7,758,303 B1 | 7/2010 | Wadia et al. |
| 7,963,099 B2 | 6/2011 | Renggli |

* cited by examiner

VARIABLE AREA EXHAUST MIXER FOR A GAS TURBINE ENGINE

CROSS-REFERENCE TO RELATED APPLICATION

This application claims priority to U.S. Provisional Patent Application No. 61/926,671 filed Jan. 13, 2014, which is hereby incorporated herein by reference in its entirety.

BACKGROUND

The present disclosure relates to variable cycle gas turbine engines, and more particularly to an exhaust mixer therefor.

Variable cycle gas turbine engines power aircraft over a range of operating conditions, yet achieve countervailing objectives such as high specific thrust and low fuel consumption. The variable cycle gas turbine engine essentially alters its bypass ratio during flight to match requirements. This facilitates efficient performance over a broad range of altitudes and flight conditions to selectively generate high thrust for conditions requiring maximum propulsion, e.g., takeoff or maneuvers, and optimized fuel efficiency for cruise and loiter operation.

An exhaust nozzle controls the thermodynamic cycle of the gas turbine engine and enhances the thrust produced by the gas turbine engine flow stream. In variable cycle gas turbine engines, the size of the exhaust nozzle may need to vary considerably to accommodate large changes in the cycle and the individual flow streams may require a variable nozzle to maximize performance and efficiency.

SUMMARY

A variable area exhaust mixer for a gas turbine engine, according to one disclosed non-limiting embodiment of the present disclosure, includes an outer wall with a multiple of doors. Each of the multiple of doors is operable to control a passage entrance to a strut flow passage within at least one of a multiple of circumferentially arrayed vanes.

In a further embodiment of the present disclosure, each of the multiple of doors hinge inward toward the multiple of circumferentially arrayed vanes.

In a further embodiment of any of the foregoing embodiments of the present disclosure, each of the multiple of doors hinge inward toward each respective circumferentially arrayed vane of the multiple of circumferentially arrayed vanes.

In a further embodiment of any of the foregoing embodiments of the present disclosure, each of the multiple of doors hinge about an axis generally parallel to a longitudinal engine axis of a gas turbine engine.

In a further embodiment of any of the foregoing embodiments of the present disclosure, each of the multiple of circumferentially arrayed vanes includes at least one trailing edge flap operable to control a passage exhaust from the respective strut flow passage.

In a further embodiment of any of the foregoing embodiments of the present disclosure, each of the trailing edge flaps hinge about an axis generally transverse to a longitudinal engine axis of the gas turbine engine.

In a further embodiment of any of the foregoing embodiments of the present disclosure, at least one of the multiple of circumferentially arrayed vanes includes one or more spraybars from a fuel manifold to selectively direct fuel through the multiple of circumferentially arrayed vanes to provide thrust augmentation.

In a further embodiment of any of the foregoing embodiments of the present disclosure, each of the multiple of circumferentially arrayed vanes includes a respective trailing edge flap operable to control a passage exhaust from the respective strut flow passage. Each of the trailing edge flaps hinge about an axis generally transverse to a longitudinal engine axis of the gas turbine engine. Each of the multiple of doors hinge about an axis generally parallel to the longitudinal engine axis of a gas turbine engine.

In a further embodiment of any of the foregoing embodiments of the present disclosure, each of the multiple of doors hinge inward toward each respective circumferentially arrayed vane of the multiple of circumferentially arrayed vanes.

A variable cycle gas turbine engine, according to another disclosed non-limiting embodiment of the present disclosure, includes a variable area exhaust mixer between a third stream fan flow path and a core flow path. The variable area exhaust mixer is operable to control flow from the third stream fan flow path to the core flow path through a multiple of circumferentially arrayed vanes.

In a further embodiment of any of the foregoing embodiments of the present disclosure, a second stream fan flow path is included radially inboard of the third stream fan flow path and radially outboard of the core flow path.

In a further embodiment of any of the foregoing embodiments of the present disclosure, the second stream fan flow path and the third stream fan flow path is downstream of a fan section.

In a further embodiment of any of the foregoing embodiments of the present disclosure, the variable area exhaust mixer includes a multiple of doors. Each of the multiple of doors is operable to control a passage entrance into at least one of the multiple of circumferentially arrayed vanes with a respective strut flow passage.

In a further embodiment of any of the foregoing embodiments of the present disclosure, each of the multiple of doors hinge about an axis generally parallel to a longitudinal engine axis of a gas turbine engine.

In a further embodiment of any of the foregoing embodiments of the present disclosure, each of the multiple of circumferentially arrayed vanes includes a respective trailing edge flap operable to control a passage exhaust from the respective strut flow passage.

In a further embodiment of any of the foregoing embodiments of the present disclosure, each of the trailing edge flaps hinge about an axis generally transverse to a longitudinal engine axis of the gas turbine engine.

In a further embodiment of any of the foregoing embodiments of the present disclosure, at least one of the multiple of circumferentially arrayed vanes includes one or more spraybars from a fuel manifold to direct fuel through the multiple of circumferentially arrayed vanes to selectively inject fuel to provide thrust augmentation.

In a further embodiment of any of the foregoing embodiments of the present disclosure, a tail cone is included radially inboard of the multiple of circumferentially arrayed vanes.

A method of operating a gas turbine engine, according to another disclosed non-limiting embodiment of the present disclosure, includes selectively changing an area-ratio between a fan flow in a third stream bypass flow path and a core flow through a core flow path downstream of a turbine section.

In a further embodiment of any of the foregoing embodiments of the present disclosure, the method includes selectively changing the area-ratio by about 20%-50%.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1A:
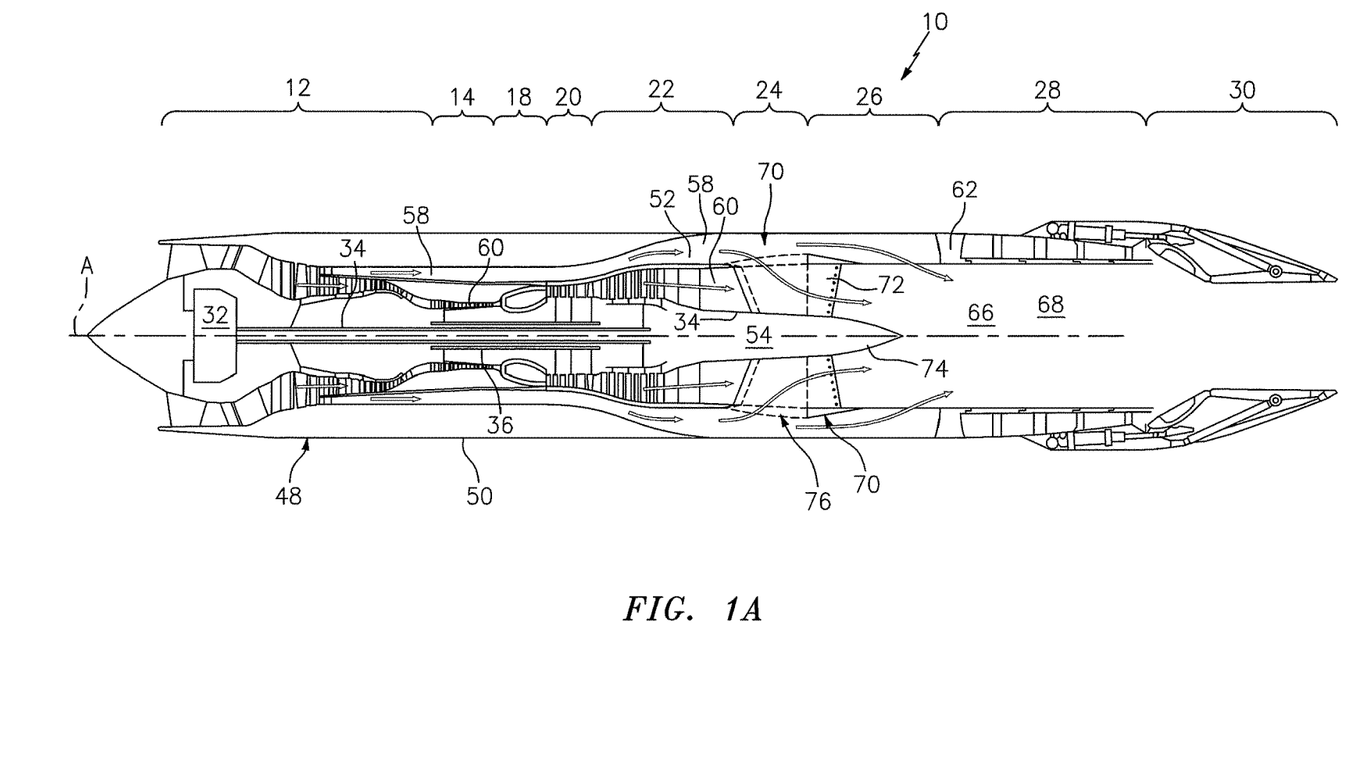
FIG. 1A is a general schematic view of an example fixed cycle (two-stream) gas turbine engine according to one non-limiting embodiment.
Figure 1B:
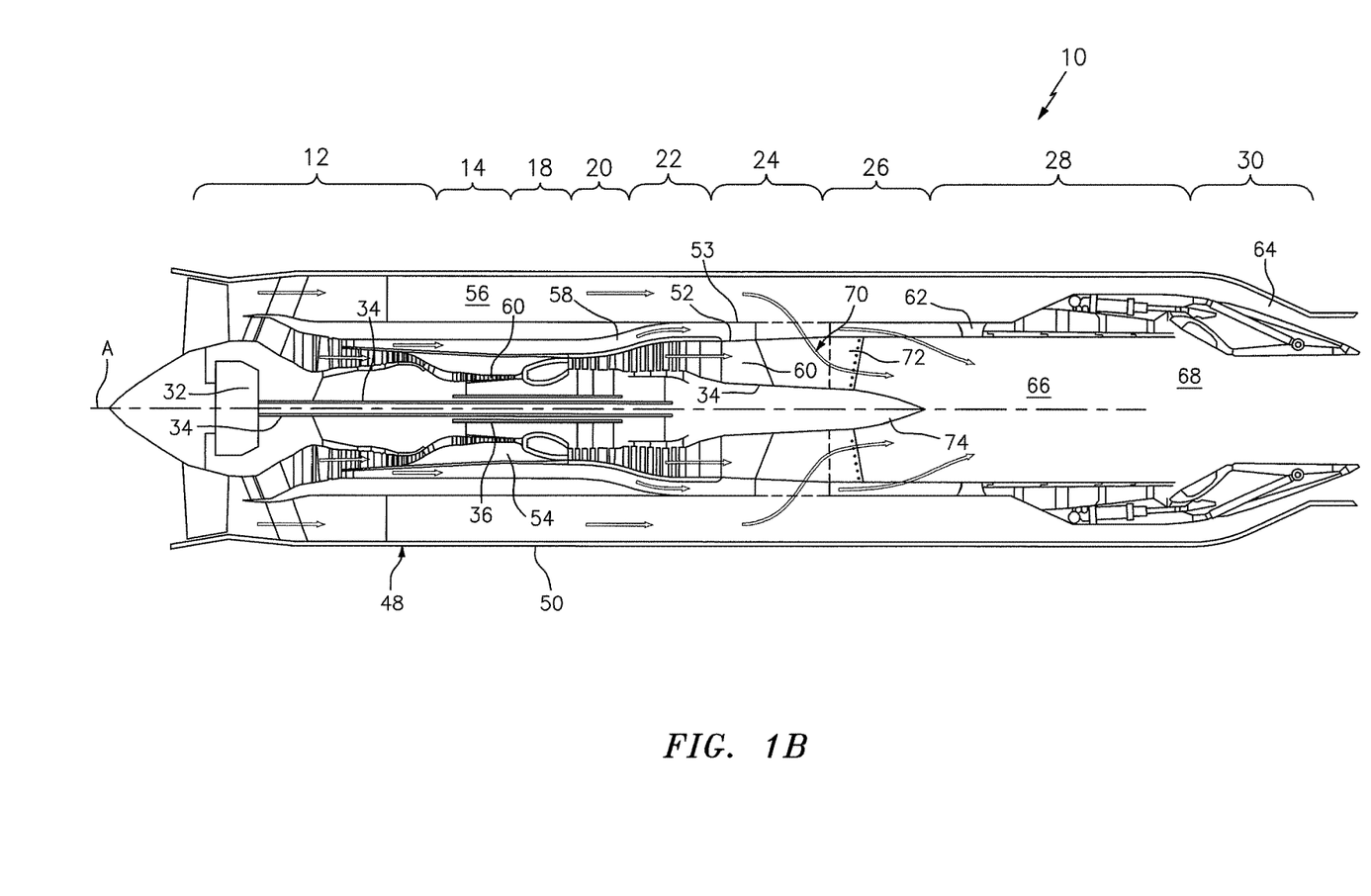
FIG. 1B is a general schematic view of an example variable cycle (three stream) gas turbine engine according to another non-limiting embodiment.

FIGS. 1A and 1B schematically illustrate example architectures for a gas turbine engine 10. The gas turbine engine 10 is disclosed herein as a fixed cycle (two-stream architecture; FIG. 1A) or a variable cycle (three-stream architecture; FIG. 1B). Each gas turbine engine 10 is a multi-spool turbofan that generally includes a fan section 12, a high pressure compressor section 14, a combustor section 18, a high pressure turbine section 20, a low pressure turbine section 22, a turbine exhaust case section 24, an augmentor section 26, an exhaust duct section 28 and a nozzle section 30 along a central longitudinal engine axis A. Although depicted with specific architectures in the disclosed non-limiting embodiments, it should be understood that the concepts described herein are not limited to only the illustrated architectures.

A low spool 34 and a high spool 36 rotate about the engine central longitudinal axis A relative to an engine case structure 48. The low pressure turbine section 22 of the low spool 34 drives the fan section 12 directly or through a geared architecture 32 to drive the first stage of fan section 12 at a lower speed than subsequent stages. Example geared architectures 32 include an epicyclic transmission, namely a planetary or star gear system, that may be located in various engine sections such as forward of the high pressure compressor section 14 or aft of the low pressure turbine section 22.

The engine case structure 48 generally includes an outer case structure 50, an intermediate case structure 52 and an inner case structure 54 (all illustrated somewhat schematically). Various static structures individual or collectively form the case structure 48 to essentially define an exoskeleton that supports rotation of the spools 34, 38.

In the fixed cycle (two-stream architecture; FIG. 1A), the fan section 12 communicates airflow into a second stream bypass flow path 58 and a core flow path 60. In the variable cycle (three-stream architecture; FIG. 1B), the fan section 12 communicates bypass flow into a third stream bypass flow path 56 as well as the second stream bypass flow path 58 and the core flow path 60. The third stream bypass flow path 56 is generally annular in cross-section and defined by the outer case structure 50 and an additional intermediate case structure 53 (see FIG. 1B). The second stream bypass flow path 58 is also generally annular in cross-section and defined by the intermediate case structure 52 and the inner case structure 54. The core flow path 60 is generally annular in cross-section and defined by the inner case structure 54. The second stream bypass flow path 58 is defined radially inward of the third stream bypass flow path 56 and the core flow path 60 is radially inward of the second stream bypass flow path 58. Various crossover and cross-communication flow paths may alternatively or additionally be provided to provide control of the flow streams, bypass ratio, and thus engine cycle.

The second stream bypass flow path 58 may include a flow control mechanism 62 (illustrated schematically) of various configurations such as electrical, pneumatic or mechanically operated blocker doors that operate as a throttle point. The flow control mechanism 62, either alone or in combination with other control mechanisms, is selectively operable to control airflow through the second stream bypass flow path 58.

The core flow is further compressed by the high pressure compressor section 14, mixed and burned with fuel in the combustor section 18, then expanded through the high pressure turbine section 20 and the low pressure turbine section 22. The turbines sections 20, 22 rotationally drive the respective spools 34, 38 in response to the expansion. It should be further appreciated that other architectures such as a three-spool architecture will also benefit herefrom.

Downstream of the turbine sections 20, 22 the exhaust duct section 28 may be circular in cross-section as typical of an axisymmetric augmented low bypass turbofan or may include non-axisymmetric cross-section segments. In addition to the various cross-sections, the exhaust duct section 28 may be non-linear with respect to the central longitudinal engine axis A to form, for example, a serpentine shape to block direct view to the turbine sections. In addition to the various cross-sections and the various longitudinal shapes, the exhaust duct section 28 may terminate in the nozzle section 30 such as a convergent-divergent, non-axisymmetric, two-dimensional (2D) vectorable, or other nozzle arrangement architectures.

In the fixed cycle (two-stream architecture; FIG. 1A), the exhaust nozzle section 30 (illustrated schematically) receives a mixed flow 66 from the second stream bypass flow path 58 and the core flow path 60 combined by the exhaust mixer 70. In the variable cycle (three-stream architecture; see FIG. 1B), the nozzle section 30 may also include a radially outboard third stream exhaust nozzle 64 (illustrated schematically). The third stream exhaust nozzle 64 may be of various nozzle architectures.

The variable area exhaust mixer 70 (also shown in FIG. 2) may be located upstream or adjacent a convergent region 68 within the exhaust duct section 28. That is, the variable area exhaust mixer 70 is axially located at an exhaust mixing plane where the second stream bypass flow path 58 joins the core flow path 60 to modulate bypass and core flow stream mixing. As the second stream bypass flow path 58 is generally at only a relatively slightly higher pressure than the flow stream from the core flow path 60, the variable area exhaust mixer 70 facilitates injection of the fan flow stream into the relatively high pressure core flow stream. The relatively high velocity of the core flow stream through the exhaust mixer 70 facilitates this injection by lowering the static pressure in the core stream 60 as it passes through the exhaust mixer 70.

In the variable cycle (three-stream architecture; see FIG. 1B), the variable area exhaust mixer 70 is axially located at the exhaust mixing plane to mix the fan flow stream from the third stream bypass flow path 56 with the core flow stream of the core flow path 60. As the third stream bypass flow path 56 is generally at only a relatively slightly higher pressure or even lower pressure than the flow stream from the core flow path 60, the variable area exhaust mixer 70 facilitates injection of the fan flow stream into the relatively high pressure core flow stream. The relatively high velocity of the core flow stream through the exhaust mixer 70 facilitates this injection by lowering the static pressure in the core stream 60 as it passes through the exhaust mixer 70.

Figure 2:
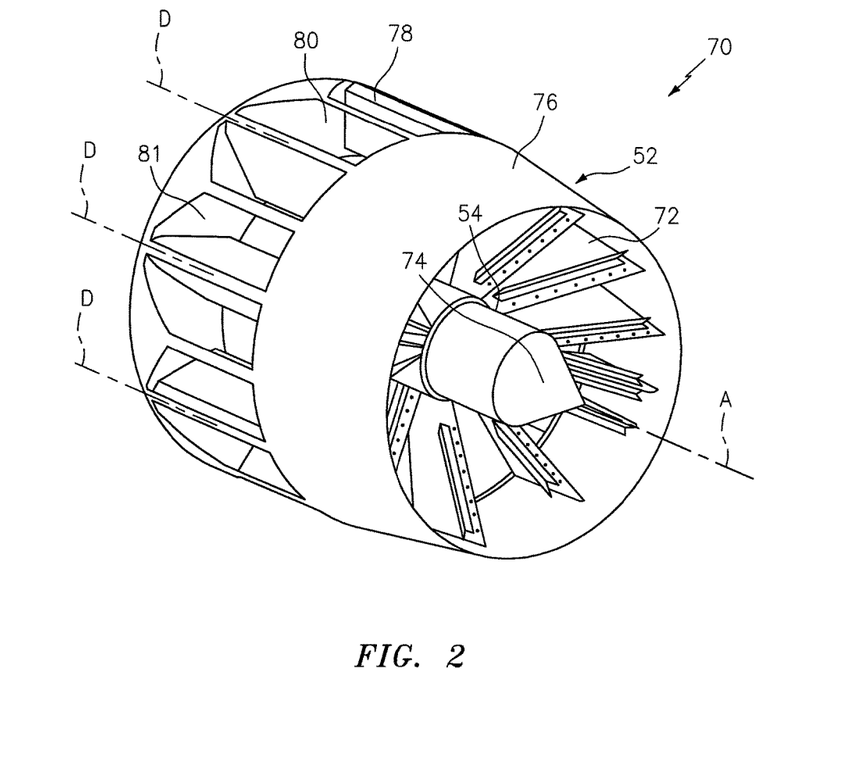
FIG. 2 is a perspective view of a variable area exhaust mixer in an open position according to one non-limiting embodiment.

With reference to FIG. 2, the variable area exhaust mixer 70 includes a multiple of circumferentially arrayed and radially extending vanes 72. The multiple of circumferentially arrayed vanes 72 may extend between the inner case structure 54 and the intermediate case structure 52. In one disclosed non-limiting embodiment, the intermediate case structure 52 terminates with an outer wall 76 of the variable area exhaust mixer 70 and the inner case structure 54 terminates with a tail cone 74.

The outer wall 76 of the variable area exhaust mixer 70 includes a multiple of doors 78 each of which controls a passage entrance 80 to a plenum 81 that is open to a strut flow passage 82 formed through each of the respective vanes 72. In one disclosed non-limiting embodiment, each of the multiple of doors 78 hinges inward into the plenum 81 about a respective axis D generally parallel to the central longitudinal engine axis A. It should be appreciated that door arrangements such as sliding doors may alternatively or additionally be utilized. In this disclosed non-limiting embodiment, each two (2) of the multiple of doors 78 are located radially outbound of each strut flow passage 82 to provide an inwardly directed rectilinear ramped passage entrance 80 to provide a relatively large flow area for the fan flow stream(s). The multiple of doors 78 thereby provide significant flow capacity that selectively increases the bypass area-ratio between the fan flow stream and the core flow stream when the variable area exhaust mixer 70 is open.

Figure 3:
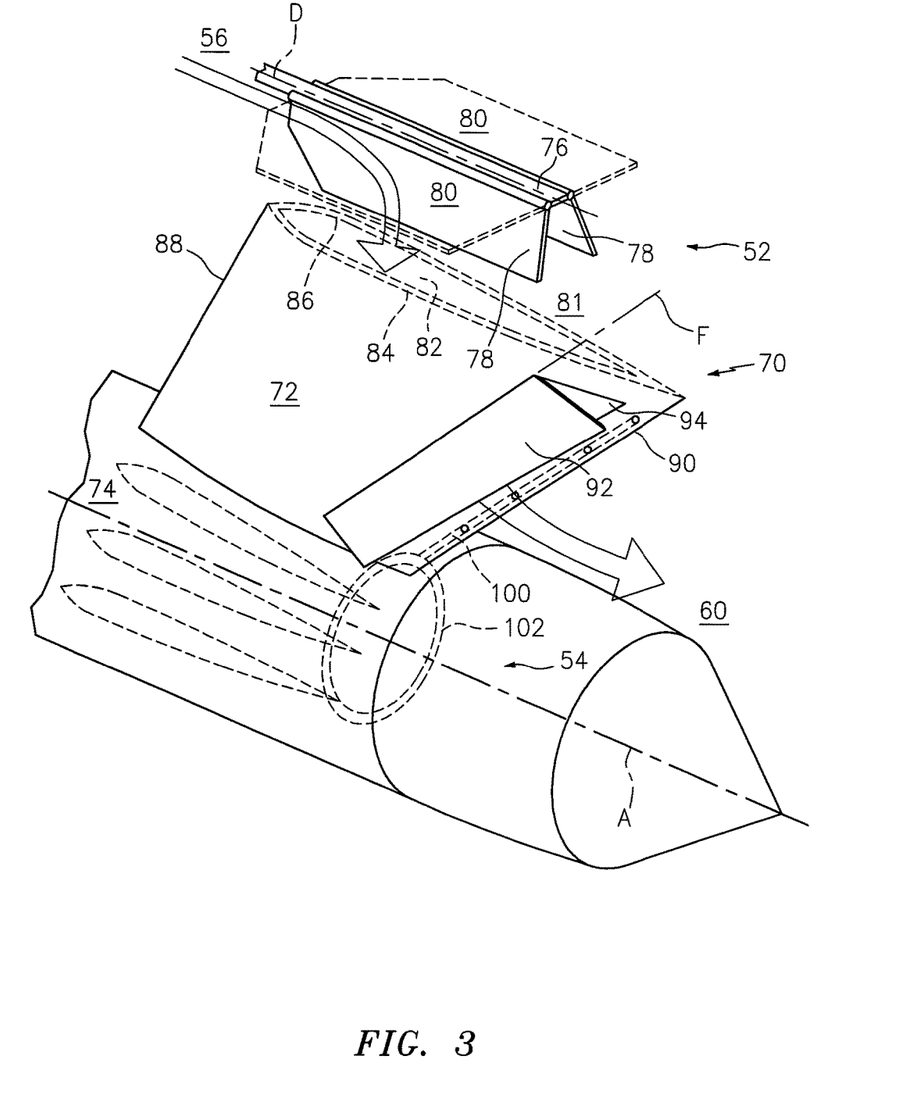
FIG. 3 is a perspective view of one vane of the variable area exhaust mixer in an open position.

With reference to FIG. 3, each of the multiple of circumferentially arrayed vanes 72 include first and second walls 84, 86, joined at a leading edge 88 and a trailing edge 90 to define the strut flow passage 82. The first and second walls 84, 86 may form an airfoil or other aerodynamic shape.

Figure 4:
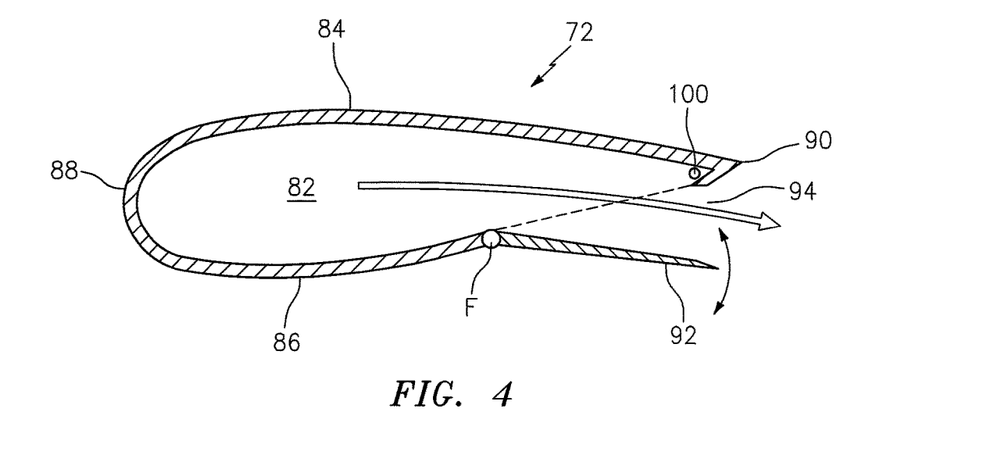
FIG. 4 is a lateral cross section of the vane of FIG. 3.

At least one of the first and second walls 84, 86 of each of the multiple of circumferentially arrayed vanes 72 includes a trailing edge flap 92. When the trailing edge flap is closed an aerodynamic vane shape is formed to minimize pressure flow loss for core flow stream passage through the variable area exhaust mixer 70. The trailing edge flap 92 is selectively opened to form a passage exhaust 94 from the respective strut flow passage 82 (also shown in FIGS. 4 and 5).

Figure 5:
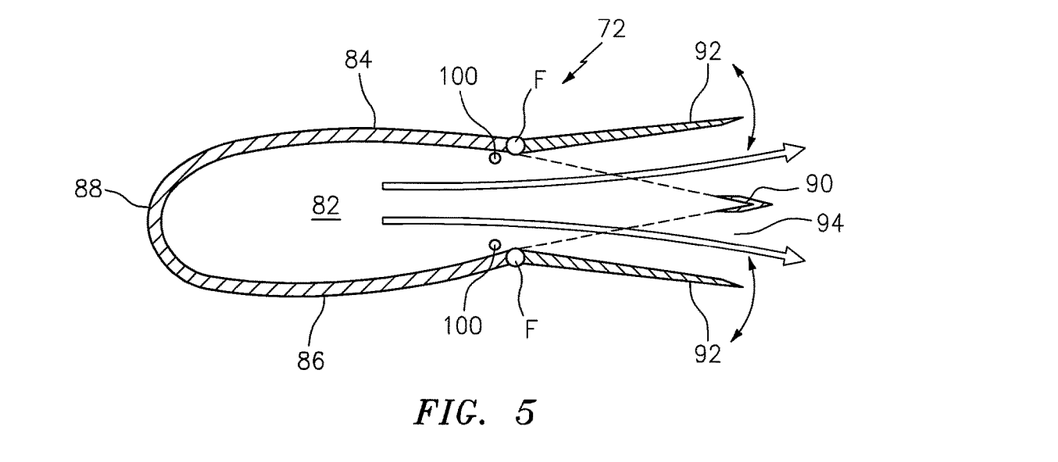
FIG. 5 is an a lateral cross-section of a vane according to another non-limiting embodiment.

The trailing edge flap 92 may be hinged along an axis F with respect to one of the first and second walls 84, 86 (FIG. 4) or, alternatively, from both of the first and second walls 84, 86 to form as a split flap arrangement (FIG. 5). In these disclosed non-limiting embodiments, the axis F is generally transverse to the axis D and the longitudinal engine axis A. The multiple of doors 78 and respective trailing edge flaps 92 are selectively operable to form a relatively large area flowpath between the fan stream flow path 56 or 58 and the core flow path 60 for high bypass operations.

When open, the variable area exhaust mixer 70 substantially changes the area-ratio between the fan flow path(s) 56, 58 and the core flow path 60. Furthermore, the generally transverse arrangement of the multiple of doors 78 to the multiple of trailing edge flaps 92 of the variable area exhaust mixer 70 facilitates uniform mixture and redirection of the fan flow stream(s) from the fan flow path(s) 56, 58 radially inward then axially aftward along the longitudinal engine axis A to provide mixing uniformity with minimum mixing pressure loss. The multiple of circumferentially arrayed vanes 72 further facilitate uniform radial mixing of the fan flow stream to increase propulsive efficiency as the relatively uniform mixing of the relatively cool air from the fan flow stream with the relatively hot core combustion products of the core flow stream downstream of the low pressure turbine section 22 provides increased propulsion efficiency and reduced exhaust jet noise.

Figure 6:
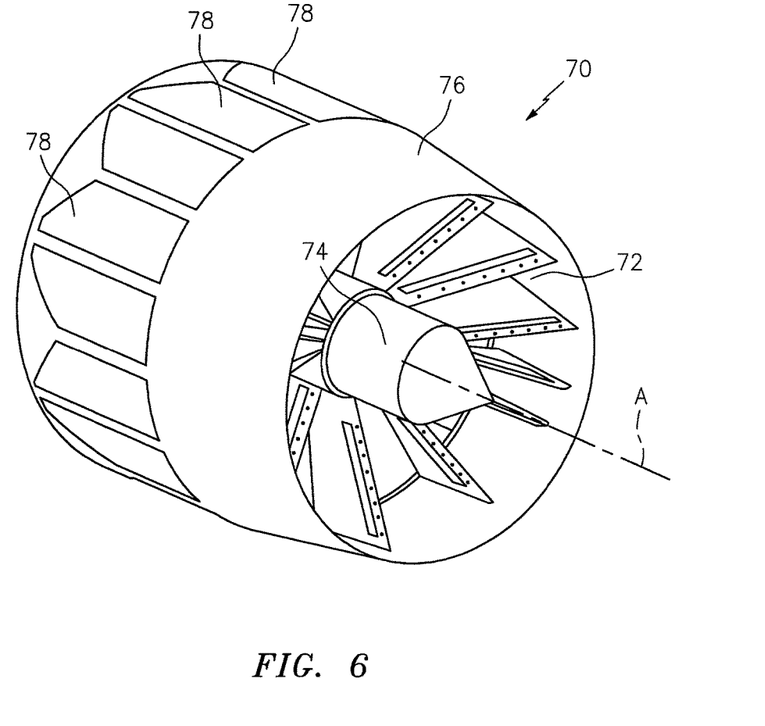
FIG. 6 is a perspective view of the variable area exhaust mixer in a closed position.
Figure 7:
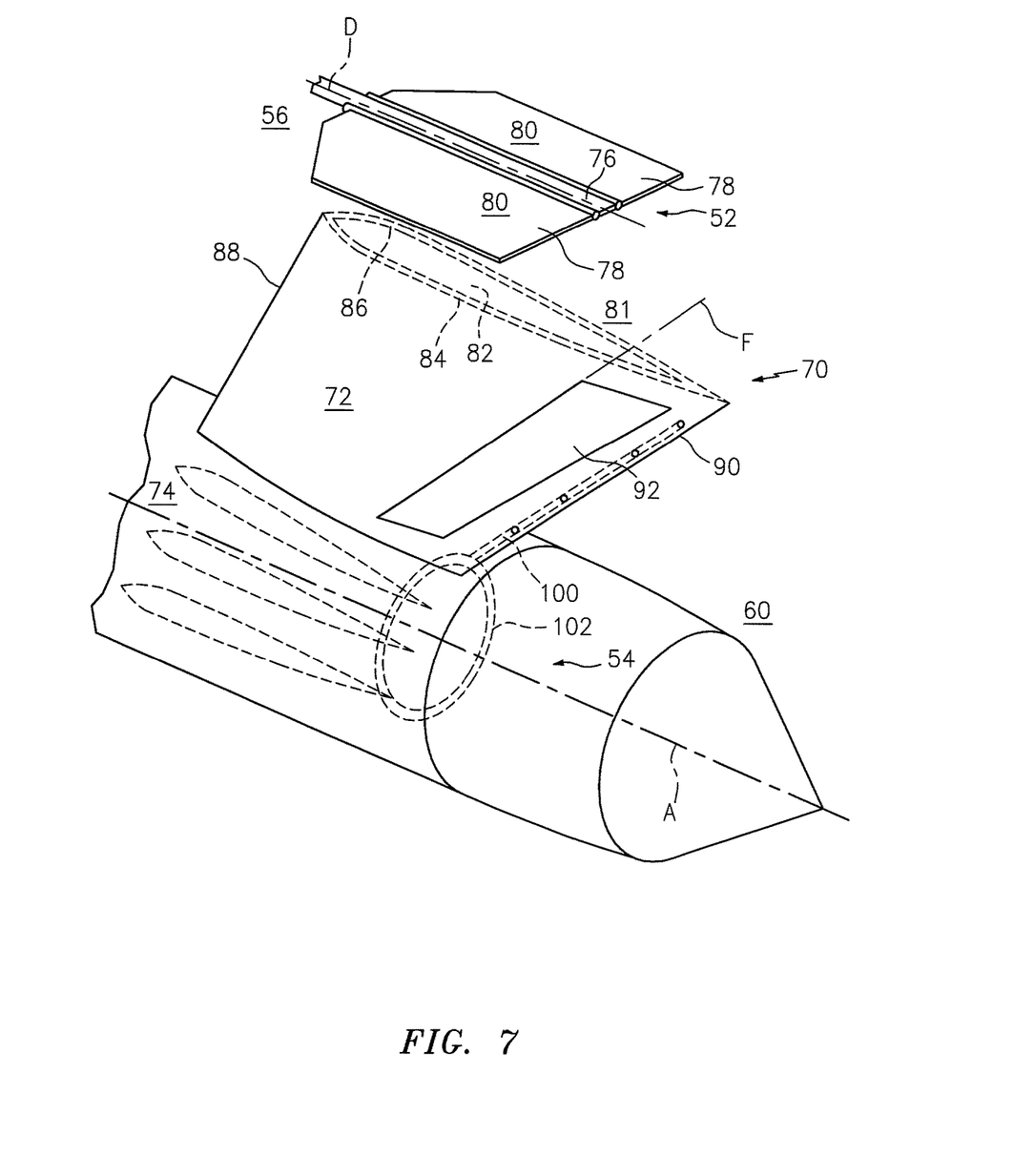
FIG. 7 is a perspective view of one vane of the variable area exhaust mixer in a closed position.

In one operational example, the variable area exhaust mixer 70 is operable to change the area-ratio between the fan flow stream and the core flow stream by about 20%-50%. In other words, during high bypass operation, the variable area exhaust mixer 70 is opened (FIGS. 3, 4, 5) from a closed position (FIGS. 6 and 7) to increase the bypass ratio by about 20%-50%.

The multiple of doors 78 and the respective trailing edge flaps 92 of the variable area exhaust mixer 70 may be selectively actuated via electric actuators, pneumatic actuators, mechanical actuators, or combinations thereof to alter the bypass ratio during flight to match requirements. This facilitates efficient performance over a broad range of altitudes and flight conditions to generate high thrust for high-energy maneuvers yet optimize fuel efficiency for cruise and loiter operations.

The augmentor section 26 may be located downstream of the variable area exhaust mixer 70, or alternatively, may be integrated into the respective multiple of circumferentially arrayed vanes 72 to selectively provide thrust augmentation with the oxygen-rich fan flow stream. In this disclosed non-limiting embodiment, one or more of the multiple of circumferentially arrayed vanes 72 may contain one or more spraybars 100 from a fuel manifold 102 within the tail cone 74 to selectively spray fuel for thrust augmentation through the first and/or second walls 84, 86. The relatively low velocity flow stream from the multiple of vanes 72, in combination with their rear-facing trailing edges 90 thereof are readily configured to provide bluff body flame holders to generate a low velocity region in the exhaust flow stream to facilitate flame stability for the augmentor section 26.

The variable area exhaust mixer 70 provides substantial benefits in fuel-burn, range, and performance by facilitation of an engine cycle with a variable bypass ratio that can be integrated with thrust augmentation features to provide an adaptive, multi-functional, variable exhaust systems for various propulsion systems. The variable area exhaust mixer 70 also facilitates noise reduction though a decrease in the exhaust jet temperature and velocity and efficient mixture of the fan and core flow streams with a significant range of variability in area ratio. The variable area exhaust mixer 70 is also compact and readily integrates with a turbine exhaust case and vehicle nozzle to reduce system weight, which otherwise trades with mixing efficiency and losses.

It should be understood that relative positional terms such as "forward," "aft," "upper," "lower," "above," "below," and the like are with reference to the engine but should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A variable area exhaust mixer combining a core stream from a core of a gas turbine engine with a bypass stream bypassing the core, the variable area exhaust mixer comprising:
    a multiple of circumferentially arrayed vanes each having a respective strut flow passage internal thereto, each respective strut flow passage is open at a radially outbound end to a respective plenum, each respective plenum having a passage entrance;
    an outer wall with a multiple of doors;
    the passage entrance of each respective plenum is operable to be opened and closed by at least one of the multiple of doors, to thereby control flow of the bypass stream through each respective strut flow passage and the respective plenum,
    wherein each of the multiple of doors is hinged along the outer wall about a rotational axis that is parallel to a central longitudinal engine axis of the gas turbine engine.

2. The variable area exhaust mixer as recited in claim 1, wherein for the passage entrance of each respective plenum the at least one of the multiple of doors hinges inward toward the respective plenum.

3. The variable area exhaust mixer as recited in claim 1, wherein for the passage entrance of each respective plenum the at least one of the multiple of doors includes two of the multiple of doors to provide an inwardly directed and ramped configuration of the passage entrance.

4. The variable area exhaust mixer as recited in claim 1, wherein each of the multiple of circumferentially arrayed vanes includes at least one trailing edge flap operable to control a passage exhaust from the respective strut flow passage.

5. The variable area exhaust mixer as recited in claim 4, wherein each of the trailing edge flaps hinge about an axis transverse to the central longitudinal engine axis of the gas turbine engine.

6. The variable area exhaust mixer as recited in claim 4, wherein the at least one trailing edge flap includes a first flap that hinges about a first edge axis with respect to a first wall and a second flap that hinges about a second edge axis with respect to a second wall for each of the multiple of circumferentially arrayed vanes to form a split flap arrangement.

7. The variable area exhaust mixer as recited in claim 4, wherein the at least one trailing edge flap of each of the multiple of circumferentially arrayed vanes is hinged about a first edge rotational axis with respect to a first wall.

8. The variable area exhaust mixer as recited in claim 1, wherein at least one of the multiple of circumferentially arrayed vanes includes at least one spraybar connected to a fuel manifold to selectively direct fuel through the at least one of the multiple of circumferentially arrayed vanes to provide thrust augmentation.

* * * * *